United States Patent [19]

Benham et al.

[11] Patent Number: 5,284,926
[45] Date of Patent: Feb. 8, 1994

[54] CATALYST SYSTEM AND PROCESS

[75] Inventors: Elizabeth A. Benham; Joseph S. Shveima; Max P. McDaniel, all of Bartlesville, Okla.

[73] Assignee: Phillips Petroleum Company, Bartlesville, Okla.

[21] Appl. No.: 950,536

[22] Filed: Sep. 25, 1992

[51] Int. Cl.$^5$ .............................. C08F 4/78; C08F 2/38
[52] U.S. Cl. ...................... 526/98; 526/105; 526/129; 526/137; 526/348.3; 526/348.4; 526/348.5; 526/348.6; 526/905; 502/104; 502/107; 502/117; 502/119; 502/228
[58] Field of Search ................. 526/98, 105, 129, 905, 526/137; 502/104, 107, 117, 119, 228

[56] References Cited

U.S. PATENT DOCUMENTS

| | | | |
|---|---|---|---|
| 3,526,601 | 9/1970 | Fotis, Jr. et al. | 526/105 X |
| 3,891,611 | 6/1975 | Abe et al. | 526/105 |
| 4,130,505 | 12/1978 | Nasser, Jr. et al. | 526/98 X |
| 4,374,234 | 2/1983 | Stricklen et al. | 526/105 |
| 4,439,543 | 3/1984 | McDaniel et al. | 502/228 |
| 4,596,862 | 6/1986 | McDaniel et al. | 526/106 |
| 4,735,931 | 4/1988 | McDaniel et al. | 502/107 |
| 4,806,513 | 2/1989 | McDaniel et al. | 502/107 |
| 4,946,914 | 8/1990 | Hsieh | 526/106 |
| 5,155,186 | 10/1992 | Hogan et al. | 526/98 X |

FOREIGN PATENT DOCUMENTS

0912275 12/1962 United Kingdom ................. 526/98

OTHER PUBLICATIONS

Hawley's Condensed Chemical Dictionary, Eleventh Edition, p. 46.
Handbook of Chemistry and Physics, 56th Edition, 1975-1976, pp. B-70 & B-121.

*Primary Examiner*—Fred Teskin
*Attorney, Agent, or Firm*—Carl D. Corvin

[57] ABSTRACT

An ethylene polymerization catalyst system is provided. This catalyst system is produced by the process comprising forming an activated and reduced composition that is substantially free of titania and that comprises a fluorine compound, a chromium compound, and a catalyst support that consists essentially of silica.

An ethylene polymerization process is provided. This process uses the ethylene polymerization catalyst system above. This catalyst system is contacted with ethylene, in the presence of hydrogen and trialkylaluminum, under polymerization conditions, to produce a polyethylene resin.

41 Claims, No Drawings

CATALYST SYSTEM AND PROCESS

BACKGROUND OF THE INVENTION

This invention relates to the field of catalyst systems and catalyst processes.

Ethylene polymerized by chromium/silica catalyst technology is known in the art. The polyethylene resins produced by this technology will generally have a high molecular weight. Hydrogen, which is a known molecular weight reducer in titanium trichloride catalyst systems, will generally have little effect on the molecular weight of polyethylene resins produced by chromium/silica catalyst systems. This invention provides a chromium/silica catalyst system that has a high sensitivity to hydrogen. These chromium/silica catalyst systems will produce lower molecular weight polyethylene resins when hydrogen is used to modify the molecular weight of these polyethylene resins.

SUMMARY OF THE INVENTION

It is an object of this invention to provide an improved catalyst system.

It is another object of this invention to provide an improved catalyst process.

It is still another object of this invention to provide an improved ethylene polymerization catalyst system.

It is still another object of this invention to provide an improved ethylene polymerization process.

It is still another object of this invention to provide an improved ethylene polymerization catalyst system that can produce a polyethylene resin with a melt index greater than ten grams per ten minutes.

It is still another object of this invention to provide an improved ethylene polymerization process that can produce a polyethylene resin with a melt index greater than ten grams per ten minutes.

In accordance with one embodiment of this invention catalyst system is provided. This catalyst system is produced by the process comprising: (a) forming a composition that is substantially free of titania and that comprises (1) a fluorine compound; (2) a chromium compound; and (3) a catalyst support that consists essentially of silica; (b) activating said composition formed in step (a) by contacting with said composition an oxygen-containing ambient; and (c) reducing said composition activated in step (b), by contacting with said composition carbon monoxide.

In another embodiment of this invention an ethylene polymerization catalyst system is provided. This catalyst system is produced by the process comprising: (a) forming a composition that is substantially free of titania and that comprises (1) a chromium compound; and (2) a catalyst support that consists essentially of silica; (b) activating said composition formed in step (a) by contacting with said composition an oxygen-containing ambient; and (c) contacting the activated composition of step (b) with a fluorine compound; (d) activating the fluorine-contacted composition of step (c) by contacting with said composition an oxygen-containing ambient; and (e) reducing the activated composition of step (d) by contacting with said composition carbon monoxide.

In another embodiment of this invention a catalyst system is provided. This catalyst system is produced by the process comprising: (a) forming a composition that is substantially free of titania and that comprises (1) a fluorine compound; and (2) a catalyst support that consists essentially of silica; (b) activating said composition formed in step (a) by contacting with said composition an oxygen-containing ambient; and (c) contacting the activated composition of step (b) with a chromium compound; (d) activating the chromium-contacted composition of step (c) by contacting with said composition an oxygen-containing ambient; and (e) reducing the activated composition of step (d), by contacting with said composition carbon monoxide.

In another embodiment of this invention, the above three embodiments of the catalyst system can separately be contacted with ethylene, in the presence of hydrogen and trialkylaluminum, under polymerization conditions, to produce a polyethylene resin.

The invention as disclosed in this application can be suitably practiced in the absence of any steps, components, compounds, or ingredients not specifically disclosed herein.

DETAILED DESCRIPTION OF THE INVENTION

In general, the catalyst system used in the invention comprises a catalyst and a catalyst support. The catalyst support is not meant to be construed as an inert component of the catalyst system. In fact, it has been established that catalyst supports can greatly affect the final properties of the catalyst system.

The catalyst support used in this invention consists essentially of silica. However, it is within the scope of this invention to use two or more different types of silica. It is also preferred that the catalyst support be substantially free of titania. This is because it is believed that the titania might adversely affect the results of this invention. These catalyst supports are well known in the art and are disclosed in U.S. Pat. Nos. 3,900,457; 4,081,407; 4,392,990; 4,405,501; 4,735,931; and 4,981,831; entire disclosures of which are hereby incorporated by reference.

One component of the catalyst system is a chromium compound. Suitable chromium compounds are chromium nitrate, chromium acetate, and chromium trioxide. It is within the scope of this invention to use two or more of these chromium compounds. The amount of chromium compound combined with the silica support is from about 0.05 weight percent to about 20 weight percent, preferably it is about 0.1 weight percent to about 10 weight percent, and most preferably it is 0.25 weight percent to 5 weight percent, based on the weight of the silica catalyst support.

The chromium compound can be combined with the silica support in any manner known in the art. Examples of combining the catalyst with the catalyst support are disclosed in the above-cited and incorporated patents.

The fluorine compound can be combined with the catalyst system in several different ways. For example, the silica support, the fluorine compound, and the chromium compound can be contacted together in any order, and thereafter, this fluorine/chromium/silica composition can be activated. As another example, the silica support can be contacted with the chromium compound, and thereafter, the chromium/silica composition can be activated; after this activation the chromium/silica composition can be contacted with the fluorine compound, and thereafter, the fluorine/chromium/silica compound can be activated again. As yet another example, the silica support can be contacted with the fluorine compound, and thereafter, this fluorine/silica composition can be activated; after this activation the fluorine/silica composition can be contacted with the chromium compound, and thereafter, the fluorine/chromium/silica compound can be activated again.

A more specific example of contacting the fluorine compound with the silica support is as follows. The silica support, the chromium compound, and the fluorine compound can be mixed into a slurry composition. Any suitable solvent can be used which does not completely dissolve the fluorine compound, the chromium compound, or the silica support. Examples of suitable solvents include, but are not limited to, water, methanol, ethanol, propanol, and butanol. It is within the scope of this invention to use two or more of these solvents. It is however, preferred to use an alcohol because of its volatility and low surface tension. After forming the slurry composition, it can be dried by any manner known in the art. Examples of drying techniques are suction filtration, evaporation, and vacuum drying. It is also within the scope of this invention to use two or more different drying techniques.

Another more specific example of contacting the fluorine compound with the silica support is as follows. The silica support and the chromium compound can be contacted together in any manner known in the art. This chromium/silica support composition can then be activated. Thereafter, this activated chromium/silica composition can then be contacted with a solid, decomposable fluorine compound. This fluorine/chromium/silica composition can then be further activated. During this activation the fluorine compound will decompose onto and/or into the silica support.

Examples of fluorine compounds are ammonium bifluoride ($NH_4HF_2$), ammonium fluoroborate ($NH_4BF_4$), ammonium silicofluoride (($NH_4)_2SiF_6$), phosphorous trifluoride ($PF_3$), and phosphorous pentafluoride ($PF_5$). It is within the scope of this invention to use two or more of these fluorine compounds. The amount of fluorine to incorporate into and/or onto the silica support is from about 0.05 weight percent to about 20 weight percent, preferably it is from about 0.1 weight percent to 10 weight percent and most preferably, it is from 0.25 to 5 weight percent, based on the weight of the silica support.

Further examples of contacting the fluorine compound with the silica support are in U.S. Pat. Nos. 2,825,721 and 4,806,513; the entire disclosures of which are hereby incorporated by reference.

Activation can occur in a variety of ways. In general, activation occurs when the chromium compound and/or the fluorine compound is contacted with an oxygen-containing ambient. This contacting should take place at a temperature from about 300° C. to about 1000° C. However, the proper temperature range depends on the composition that is to be activated. For example, if a chromium/silica composition is to be activated (the composition has not yet been contacted with the fluorine compound) the entire temperature range of about 300° C. to about 1000° C. may be used. However, it is preferred that a temperature range from about 600° C. to about 950° C. be used; it is more preferred that a temperature range of about 650° C. to about 900° C. be used; and it is most preferred that a temperature range of 675° C. to 875° C. be used. These temperature ranges are preferred, in part, because of the higher catalyst activities that can be obtained by subjecting the chromium compound to these higher temperature. As another example, if a fluorine/chromium/silica or fluorine/silica composition is to be activated, a temperature range of about 300° C. to 700° C. should be used. However, it is preferred that a temperature range of about 400° C. to about 700° C. be used; it is more preferred that a temperature range of about 450° C. to about 650° C. be used; and it is most preferred that a temperature range of 525° C. to 625° C. be used. These temperature ranges are preferred, in part, because temperatures above 700° C. tend to subject the fluorine containing compositions to a level of thermal stress which may be detrimental to the final catalyst system.

In summary, if the composition to be activated contains fluorine, activation temperatures below 700° C. should be used; if however, the composition to be activated contains no fluorine, activation temperatures up to 1000° C. may be used. It should be noted that in any case, the compositions should be contacted with the oxygen-containing ambient for a time from about 1 minute to about 100 hours.

After both the fluorine compound and chromium compound have been subjected to an activation step, the composition is subjected to at least a partial reduction of the chromium. A preferred reducing agent is carbon monoxide. The carbon monoxide can be employed at temperatures in the range of about 100° C. to about 600° C. Preferably, the temperature the reduction is conducted at is in the range of about 200° C. to about 500° C., and most preferably from 250° C. to 450° C. The partial pressure of the reducing gas can be varied from subatmospheric pressures to supra atmospheric pressures (>100 MPa). The simplest reducing procedure is to utilize essentially pure carbon monoxide at about atmospheric pressure. The reduction time can vary from a few minutes to several hours or more. The extent of reduction can be followed by visual inspection of the composition's color. The color of the composition after activation is generally orange, indicating the presence of hexavalent chromium. The composition after reduction is generally blue, indicating the presence of divalent chromium. After the reduction treatment, excess CO is flushed from the system with an inert gas such as argon or nitrogen. Further examples of reduction treatments are disclosed in U.S. Pat. No. 4,735,631, incorporated above, and U.S. Pat. No. 4,439,453, the entire disclosure of which is hereby incorporated by reference. This fluorine/chromium/silica composition that has been activated and reduced is now the catalyst system of this invention.

Once the catalyst system is formed, it can be used to polymerize ethylene. This polymerization can be carried out in any manner known in the art such as gas phase, solution or slurry polymerization conditions. A stirred reactor can be utilized for a batch process, or the reaction can be carried out continuously in a loop reactor or in a continuous stirred reactor.

A preferred polymerization technique is that which is referred to as particle form or slurry process wherein the temperature is kept below the temperature at which the polymer goes into solution. Such polymerization techniques are well known in the art and are disclosed, for instance, in Norwood, U.S. Pat. No. 3,248,179, the entire disclosure of which is hereby incorporated by reference. Two preferred polymerization methods for the slurry process are those employing a loop reactor of the type disclosed in Norwood and those utilizing a plurality of stirred reactors either in series, parallel, or combinations thereof wherein the reaction conditions are different in the different reactors. It is possible to copolymerize ethylene with another olefin during this polymerization. Suitable examples of copolymerizable olefins are propylene, 1-butene, 3-methyl-1-butene, 1-pentene, 3-methyl-1-pentene, 4-methyl-1-pentene, 1-hexene, 3-ethyl-1-hexene, 1-octene, 1-decene, and mixtures of two or more olefins.

It is important to the polymerization process of this invention that a trialkylaluminum cocatalyst be present during the polymerization. In general, the alkyl groups of the trialkylaluminum cocatalyst should have 1 to 10 carbon atoms and preferably 2 to 4 carbon atoms. Examples include, but are not limited to, triethylaluminum and trimethylaluminum. The amount to use should be in the amount within the range of 0.5 to 10 weight percent based on the weight of the silica support, with about 1 to 8 weight percent being preferred. Stated in parts per million by weight of cocatalyst based on the weight of diluent, the cocatalyst is used in an amount within the range of 0.5 to 20 and preferably 2 to 8 parts per million by weight.

It is also important to the polymerization process of this invention that hydrogen be present during the polymerization. This is because the procedure to make the catalyst system, and its interaction with the cocatalyst, makes the catalyst system sensitive to hydrogen as a molecular weight control for the polymer.

EXAMPLES

These examples are provided to further assist a person skilled in the art with understanding this invention. The particular reactants, conditions, and the like, are intended to be generally illustrative of this invention and are not meant to be construed as unduly limiting the reasonable scope of this invention.

The following test methods were used to determine the properties of the polyethylene samples.

(1) The density was determined in accordance with ASTM-D-1505. This is a standard test method for determining the density of plastics. The density is reported in grams per cubic centimeter ($g/cm^3$).

(2) The melt index was determined in accordance with ASTM-D-1238. This is a standard test method for determining the melt index of a plastic. The testing conditions included a temperature of 190° C. and a load of 2.16 kilograms. The melt index is reported in grams per ten minutes (g/10 min.).

Preparation of the Catalysts

The silica used in each catalyst system had an average pore volume of 1.5 $cm^3/g$ and an average surface area of 120 $m^2$/gram. These types of silica supports are available commercially from several companies such as the Davison Corporation.

Catalyst A: was prepared by impregnating the above-described silica with a solution comprising ammonium hydrogen fluoride in methanol. After impregnation, the silica was dried in a vacuum oven. The silica was then impregnated with a solution comprising chromium nitrate in methanol. After this impregnation, the silica was again dried in a vacuum oven. This vacuum dried composition was then activated in air at 600° C. for about three hours. This activation was followed by carbon monoxide reduction at 350° C. for about thirty minutes. The resulting catalyst system had about one weight percent chromium and about two weight percent ammonium hydrogen fluoride where the weight percents are based on the weight of the silica support.

Catalyst B: a series of catalytic systems were made in the following manner. The silica was impregnated with a solution comprising chromium nitrate in methanol. After impregnation, the silica was dried in a vacuum oven. This composition was then activated in air at either 700° C. or 800° C. for about three hours. This composition was then transferred to a preheated (100° C.), nitrogen-flushed container. To this container solid ammonium hydrogen fluoride was added. The container was then heated to 600° C. in air for about two hours. Some of the silicas were then subjected to a carbon monoxide reduction for about thirty minutes at 350° C. The resulting catalyst system had about one weight percent chromium and about two weight percent ammonium hydrogen fluoride where the weight percents are based on the weight of the silica support.

Catalyst C: a series of catalytic systems were made in the following manner. The silica was impregnated with a solution comprising chromium nitrate in methanol. After impregnation, the silica was dried in a vacuum oven. This composition was then activated in air at either 600° C. or 700° C. for about three hours. This composition was then subjected to carbon monoxide reduction for thirty minutes at 350° C. The resulting catalytic system had about one weight percent of chromium based on the weight of the silica support.

Polymerizations with Catalysts A, B, and C

Slurry-type polymerizations were accomplished using a two-liter pressurized reactor. Isobutane was used as the diluent and ethylene was used as the monomer. The ethylene pressure was maintained at about 550 psi during the polymerization. When hydrogen pressure was maintained at about 50 psi during some of the polymerizations, triethylaluminum, as a 0.15 weight percent solution of triethylaluminum in heptane, was added to the reactor. The concentration of triethylaluminum was five parts per million by weight in the reactor. When 1-hexene was used as a comonomer, it was dried over molecular sieves before use. Run times were from 55 minutes to two hours. Productivities were normalized to one hour. The results are presented in Tables E1, E2, and E3.

TABLE E1

| POLYMERIZATIONS WITH CATALYST A | | | | |
|---|---|---|---|---|
| Run | Reactor Temp °C. | Cocatalyst | $H_2$ (Psi) | Prod g/g-hr | MI |
| 1A | 85 | TEA | 0 | 2100 | 0 |
| 1B | 90 | TEA | 0 | 2800 | 0 |
| 2A | 95 | TEA | 50 | 1800 | 35 |
| 2B | 85 | TEA | 50 | 2500 | 46 |
| 3[1] | 85 | 0 | 50 | 1600 | 0 |

Notes:
[1]4.5 weight percent 1 hexene added based on total weight of ethylene used.

This table shows that without hydrogen and a cocatalyst no increase in the melt index is observed.

TABLE E2

| POLYMERIZATION WITH CATALYST B | | | | | | |
|---|---|---|---|---|---|---|
| Run | Activation Temp °C. | CO Reduced | Reactor Temp °C. | CoCat | $H_2$ (Psi) | Prod g/g-hr | MI |
| 4A | 700 | No | 85 | TEA | 50 | 1100 | 0.018 |
| 4B | 700 | Yes | 85 | TEA | 50 | 2000 | 33 |
| 5A | 800 | No | 85 | TEA | 50 | 620 | .25 |
| 5B | 800 | Yes | 85 | TEA | 50 | 850 | 14 |

This table shows that without carbon monoxide reduction, no increase in the melt index is observed.

TABLE E3
POLYMERIZATION WITH CATALYST C

| Run | Activation Temp °C. | CO Reduced | Reactor Temp °C. | CoCat | $H_2$ (Psi) | Prod g/g-hr | MI |
|---|---|---|---|---|---|---|---|
| 6A | 600 | Yes | 85 | TEA | 50 | 1100 | 0 |
| 6B | 700 | Yes | 85 | TEA | 50 | 440 | 0 |
| 6C | 700 | Yes | 85 | TEA | 50 | 1900 | 0 |

This table shows that without a fluorine compound no increase in the melt index is observed.

What is claimed is:

1. A catalyst system produced by the process comprising:
   (a) forming a composition that is substantially free of titania and that comprises:
      (1) a fluorine compound selected from the group consisting of ammonium fluoride compounds, phosphorus fluoride compounds and mixtures of two or more said fluorine compounds;
      (2) a chromium compound; and
      (3) a catalyst support that consists essentially of silica;
   (b) activating said composition formed in step (a) by contacting said composition with an oxygen-containing ambient thereby changing a portion of the nonhexavalent chromium to hexavalent chromium; and
   (c) reducing said composition activated in step (b), by contacting said composition with an amount of carbon monoxide at a temperature in the range of about 200° C. to about 600° C. thereby changing a portion of said hexavalent chromium to divalent chromium.

2. A catalyst system according to claim 1 wherein said chromium compound is chromium nitrate, chromium acetate, chromium trioxide, or mixtures of two or more said chromium compounds.

3. A catalyst system according to claim 1 wherein said chromium compound is chromium nitrate.

4. A catalyst system according to claim 1 wherein the amount of chromium is from about 0.05 to about 20 weight percent where the weight percent is based on the weight of said catalyst support.

5. A catalyst system according to claim 1 wherein said fluorine compound is selected from the group consisting of ammonium bifluoride, ammonium fluoroborate, ammonium silicofluoride, phosphorous trifluoride, phosphorous pentafluoride, and mixtures of two or more said fluorine compounds.

6. A catalyst system according to claim 1 wherein said fluorine compound is ammonium bifluoride.

7. A catalyst system according to claim 1 wherein the amount of fluorine is from about 0.05 to about 20 weight percent where the weight percent is based on the weight of said catalyst support.

8. A catalyst system according to claim 1 wherein said activating is conducted at a temperature in the range of about 300° C. to about 700° C.

9. A catalyst system according to claim 1 wherein said reducing is conducted at a temperature in the range of about 250° C. to about 450° C.

10. An ethylene polymerization process comprising polymerizing ethylene, in the presence of hydrogen and trialkylaluminum, with a catalyst system produced according to claim 1.

11. A process according to claim 10 wherein said polymerization is conducted in the presence of at least one olefin that is not ethylene.

12. A process according to claim 11 wherein said olefin is propylene, 1-butene, 3-methyl-1-butene, 1-pentene, 3-methyl-1-pentene, 4-methyl-1-pentene, 1-hexene, 3-ethyl-1-hexene, 1-octene, 1-decene, or mixtures of two or more said olefins.

13. A process according to claim 10 wherein said trialkylaluminum is trimethylaluminum, triethylaluminum, or mixtures of trimethylaluminum and triethylaluminum.

14. A catalyst system produced by the process comprising:
   (a) forming a composition that is substantially free of titania and that comprises:
      (1) a chromium compound; and
      (2) a catalyst support that consists essentially of silica;
   (b) activating said composition formed in step (a) by contacting said composition with an oxygen-containing ambient thereby changing a portion of the nonhexavalent chromium to hexavalent chromium; and
   (c) contacting the activated composition of step (b) with a fluorine compound selected from the group consisting of ammonium fluoride compounds, phosphorus fluoride compounds and mixtures of two or more said fluorine compounds;
   (d) activating the fluorine-contacted composition of step (c) by contacting said composition with an oxygen containing ambient; and
   (e) reducing the activated composition of step (d), by contacting said composition with an amount of carbon monoxide at a temperature in the range of about 200° C. to about 600° C. thereby changing a portion of said hexavalent chromium to divalent chromium.

15. A catalyst system according to claim 14 wherein said chromium compound is chromium nitrate, chromium acetate, chromium trioxide, or mixtures of two or more said chromium compounds.

16. A catalyst system according to claim 14 wherein said chromium compound is chromium nitrate.

17. A catalyst system according to claim 14 wherein the amount of chromium is from about 0.05 to about 20 weight percent where the weight percent is based on the weight of said catalyst support.

18. A catalyst system according to claim 14 wherein said fluorine compound is selected from the group consisting of ammonium bifluoride, ammonium fluoroborate, ammonium silicofluoride, phosphorous trifluoride, phosphorous pentafluoride, and mixtures of two or more said fluorine compounds.

19. A catalyst system according to claim 14 wherein said fluorine compound is ammonium bifluoride.

20. A catalyst system according to claim 14 wherein the amount of fluorine is from about 0.05 to about 20 weight percent where the weight percent is based on the weight of said catalyst support.

21. A catalyst system according to claim 14 wherein said activating in step (b) is conducted at a temperature in the range of about 300° C. to about 1000° C.

22. A catalyst system according to claim 14 wherein said activating in step (d) is conducted at a temperature in the range of about 300° C. to about 700° C.

23. A catalyst system according to claim 14 wherein said reducing is conducted at a temperature in the range of about 250° C. to about 450° C.

24. An ethylene polymerization process comprising polymerizing ethylene, in the presence of hydrogen and trialkylaluminum, with a catalyst system produced according to claim 14.

25. A process according to claim 24 wherein said polymerization is conducted in the presence of at least one olefin that is not ethylene.

26. A process according to claim 25 wherein said olefin is propylene, 1-butene, 3-methyl-1-butene, 1-pentene, 3-methyl-1-pentene, 4-methyl-1-pentene, 1-hexene, 3-ethyl-1-hexene, 1-octene, 1-decene, or mixtures of two or more said olefins.

27. A process according to claim 24 wherein said trialkylaluminum is trimethylaluminum, triethylaluminum, or mixtures of trimethylaluminum and triethylaluminum.

28. A catalyst system produced by the process comprising:
   (a) forming a composition that is substantially free of titania and that comprises:
      (1) a fluorine compound selected from the group consisting of ammonium fluoride compounds, phosphorus fluoride compounds and mixtures of two or more said fluorine compounds; and
      (2) a catalyst support that consists essentially of silica;
   (b) activating said composition formed in step (a) by contacting said composition with an oxygen-containing ambient; and
   (c) contacting the activated composition of step (b) with a chromium compound;
   (d) activating the chromium-contacted composition of step (c) by contacting said composition with an oxygen-containing ambient thereby changing a portion of the nonhexavalent chromium to hexavalent chromium; and
   (e) reducing the activated composition of step (d), by contacting said composition with with an amount of carbon monoxide at a temperature in the range of about 200° C. to about 600° C. thereby changing a portion of said hexavalent chromium to divalent chromium.

29. A catalyst system according to claim 28 wherein said chromium compound is chromium nitrate, chromium acetate, chromium trioxide, or mixtures of two or more said chromium compounds.

30. A catalyst system according to claim 28 wherein said chromium compound is chromium nitrate.

31. A catalyst system according to claim 28 wherein the amount of chromium is from about 0.05 to about 20 weight percent where the weight percent is based on the weight of said catalyst support.

32. A catalyst system according to claim 28 wherein said fluorine compound is selected from the group consisting of ammonium bifluoride, ammonium fluoroborate, ammonium silicofluoride, phosphorous trifluoride, phosphorous pentafluoride, and mixtures of two or more said fluorine compounds.

33. A catalyst system according to claim 28 wherein said fluorine compound ammonium bifluoride.

34. A catalyst system according to claim 28 wherein the amount of fluorine is from about 0.05 to about 20 weight percent where the weight percent is based on the weight of said catalyst support.

35. A catalyst system according to claim 28 wherein said activating in step (b) is conducted at a temperature in the range of about 300° C. to about 700° C.

36. A catalyst system according to claim 28 wherein said activating in step (d) is conducted at a temperature in the range of about 300° C. to about 1000° C.

37. A catalyst system according to claim 28 wherein said reducing is conducted at a temperature in the range of about 250° C. to about 450° C.

38. An ethylene polymerization process comprising polymerizing ethylene, in the presence of hydrogen and trialkylaluminum, with a catalyst system produced according to claim 28.

39. A process according to claim 28 wherein said polymerization is conducted in the presence of at least one olefin that is not ethylene.

40. A process according to claim 39 wherein said olefin is propylene, 1-butene, 3-methyl-1-butene, 1-pentene, 3-methyl-1-pentene, 4-methyl-1-pentene, 1-hexene, 3-ethyl-1-hexene, 1-octene, 1-decene, or mixtures of two or more said olefins.

41. A process according to claim 28 wherein said trialkylaluminum is trimethylaluminum, triethylaluminum, or mixtures of trimethylaluminum and triethylaluminum.

* * * * *